US007496364B2

(12) United States Patent  (10) Patent No.: US 7,496,364 B2
Hoghooghi et al.  (45) Date of Patent: Feb. 24, 2009

(54) MEDIA-INDEPENDENT HANDOVER (MIH) METHOD FEATURING A SIMPLIFIED BEACON

(75) Inventors: Michael M. Hoghooghi, Austin, TX (US); Karl F. Heubaum, Austin, TX (US); Jeffrey Keating, Austin, TX (US); Jong Sheng M. Lee, Austin, TX (US); Daniel G. Orozco-Perez, Cedar Park, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 482 days.

(21) Appl. No.: 11/265,869

(22) Filed: Nov. 3, 2005

(65) Prior Publication Data

US 2006/0099948 A1  May 11, 2006

Related U.S. Application Data

(60) Provisional application No. 60/625,261, filed on Nov. 5, 2004.

(51) Int. Cl.
*H04Q 7/20* (2006.01)
(52) U.S. Cl. .................................. 455/436; 370/331
(58) Field of Classification Search .................. 370/331; 455/436
See application file for complete search history.

(56) References Cited

U.S. PATENT DOCUMENTS

2005/0249161 A1* 11/2005 Carlton ....................... 370/331
2006/0092864 A1   5/2006 Gupta et al.
2006/0140150 A1*  6/2006 Olvera-Hernandez et al. .... 370/331
2006/0153235 A1*  7/2006 Kiernan et al. ............... 370/469
2006/0159047 A1   7/2006 OlveraHernandez et al.
2006/0229075 A1* 10/2006 Kim et al. .................... 455/436
2006/0230151 A1  10/2006 Kim et al.

OTHER PUBLICATIONS

International Search Report.
Sood, Kapli et al.; "Seamless Platform Mobility Across Wireless Networks"; Technology @ Intel Magazine; Sep. 2005; pp. 1-8.
Williams, Michael G.' "Directions in Media Independent Handover"; IEICE Trans. Fundamentals; Jul. 2005; pp. 1771-1776; vol. E88, No. 7; Institute of Electronics, Information and Communication Engineers.

* cited by examiner

*Primary Examiner*—Duc Nguyen
*Assistant Examiner*—Wayne Cai
(74) *Attorney, Agent, or Firm*—Michael J. Balconi-Lamica

(57) ABSTRACT

A method for implementing a Media Independent Handover (MIH) service between one or more of a heterogeneous and a non-heterogeneous network comprises providing an MIH beacon from one or more of a network (Net) or a mobile node (MN); acknowledging a receipt of the MIH beacon by another of the network (Net) or the mobile node; and facilitating handover (HO) services in response to an acknowledged receipt, and further in response to an MIH beacon message subsequently provided from one or more of the network (Net) or the mobile node. In one embodiment, the MIH beacon comprises at least an MIH-Capability (MIHC) flag, the MIHC flag having one of a first state or a second state.

20 Claims, 6 Drawing Sheets

| | MIH | | NON-MIH | |
|---|---|---|---|---|
| | MN | NETWORK CONTROLLER | MN | NETWORK CONTROLLER |
| CLASS-1 FULL HO CAPABILITY — 82 | ✓ | ✓ | | |
| CLASS-2 DEVICE-INITIATED HO — 84 | ✓ | | | ✓ |
| CLASS-3 NETWORK-INITIATED HO — 86 | | ✓ | ✓ | |
| CLASS-4 LEGACY SYSTEMS NO HO — 88 | | | ✓ | ✓ |

*FIG. 3* ns network;

MEDIA-INDEPENDENT HANDOVER (MIH) METHOD FEATURING A SIMPLIFIED BEACON

CROSS-REFERENCE TO CO-PENDING APPLICATIONS

This application claims priority to provisional patent application, Ser. No. 60/625,261 entitled "MEDIA-INDEPENDENT HANDOVER (MIH) METHOD FEATURING A SIMPLIFIED BEACON" to Hoghooghi et al., filed on Nov. 5, 2004, and assigned to the assignee of the present disclosure.

BACKGROUND

The present disclosures relate to handover mechanisms, and more particularly, to a simplified beacon for media-independent handover (MIH) services.

IEEE 802 refers to a family of IEEE standards for local area networks and metropolitan area networks. Services and protocols specified in IEEE 802 map to the lower two layers of the seven-layer Open Systems Interconnection (OSI) networking reference model. The lower two layers correspond to the Data Link and Physical (PHY) layers. Furthermore, the Data Link layer is split into two sub-layers, corresponding to the Logical Link Control (LLC) and the Medium Access Control (MAC).

As an emerging standard, the IEEE 802.21 is to provide seamless handover between networks of the same type, as well as handover between different network types. Accordingly, the IEEE 802.21 is referred to as the Multi media Independent Handover or Media Independent Handover (MIH) standard. The standard is to allow for handing over to and from cellular (GSM, GPRS, EDGE, W-CDMA, CDMA, CDMA2000), IEEE 802.11 (Wi-Fi), Bluetooth and IEEE 802.16 (WiMAX) networks. The emerging IEEE 802.21 standard became necessary in view of the following. Cellular networks and 802.11 networks employ handover mechanisms for handover within the same network and mobile IP employs handover mechanisms for handover across different networks of the same type. However, current IEEE 802 standards do not support for handover between different types of networks. In addition, existing IEEE 802 standards provide mechanisms for detecting and selecting network access points, but do not allow for detection and selection of network access points in a way that is independent of the network type.

In addition to the above, various problems exist in the art of wireless communication systems. The problems may include one or more of: 1) an absence of fast, reliable and universally recognized handover (HO) mechanisms between multi-protocol capable nodes; 2) complex and slow speed HO services between heterogeneous networks; 3) an excess of associated network overhead required for HO services; or 4) a lack of efficiency and capacity of wireless networks while providing new and added services for the mobile subscribers.

Accordingly, there is a need for an improved method and apparatus for overcoming the problems in the art as discussed above.

BRIEF DESCRIPTION OF THE DRAWINGS

The present invention is illustrated by way of example and not limited by the accompanying figures, in which like references indicate similar elements, and in which:

FIG. 3 is a classification table view of possible handover (HO) scenarios for (i) MIH capable and (ii) non-MIH capable mobile units and (i) MIH capable and (ii) non-MIH capable network controllers according to an embodiment of the present disclosure;

The use of the same reference symbols in different drawings indicates similar or identical items. Skilled artisans will also appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

The embodiments of the present disclosure help to establish a fast, reliable, and optimized method for enabling MIH services by providing an MIH beacon as disclosed herein, thereby potentially leading to a standardized format between disparate wireless and wired network protocols. The embodiments could also be applied to seamless mobility technology.

In particular, the embodiments of the present disclosure provide a simplified beacon for Media-Independent Handover (MIH) Services. The embodiments further provide for a fast, reliable and universally recognized Handover (HO) mechanism between multi-protocol capable nodes; simplifying and speeding up HO services between heterogeneous networks; reducing associated network overhead required for HO services; and increasing efficiency and capacity of wireless networks while providing new and added services for the mobile subscribers.

Figure 1:
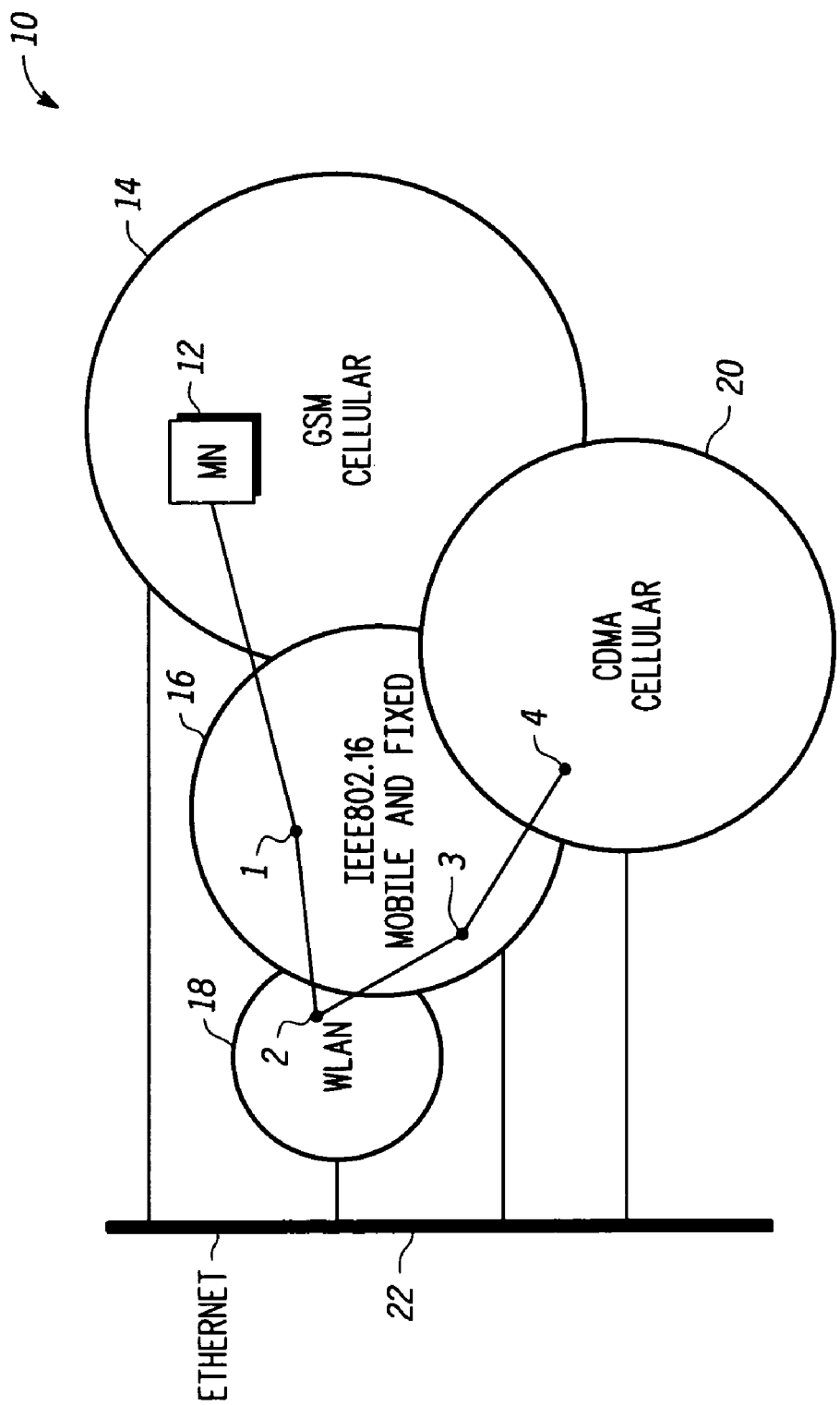
FIG. 1 is a schematic block diagram view of a heterogeneous network.

FIG. 1 is a schematic block diagram view of a heterogeneous network 10. The heterogeneous network 10 is traversed by a mobile node (MN) 12. For the mobile node (MN) 12, device handover (HO) can occur based upon movement of the mobile node (MN) 12 wherein the movement causes a gap in radio coverage. Occurrences of a device handover (HO) are indicated by reference numerals 1, 2, 3 and 4 in FIG. 1. Device handover (HO) may also occur due to a change in wireless link conditions. In the example of FIG. 1, the heterogeneous network 10 includes a GSM cellular network 14, an IEEE 802.16 Mobile and Fixed network 16, a wireless local area network (WLAN) 18, and a CDMA cellular network 20. The networks 14, 16, 18 and 20 each couple to Ethernet 22. At the point indicated by reference numeral 1, a device handover (HO) occurs between GSM cellular network 14 and IEEE 802.16 mobile and fixed network 16 for mobile node (MN) 12. At the point indicated by reference numeral 2, a device handover (HO) occurs between the IEEE 802.16 mobile and fixed network 16 and wireless local area network (WLAN) 18 for mobile node (MN) 12. At point 3, a device handover (HO)

occurs between the wireless local area network (WLAN) 18 and IEEE 802.16 mobile and fixed network 16 for mobile node (MN) 12. At point 4, a device handover (HO) occurs between the IEEE 802.16 mobile and fixed network 16 and CDMA cellular network 20 for mobile node (MN) 12.

Figure 2:
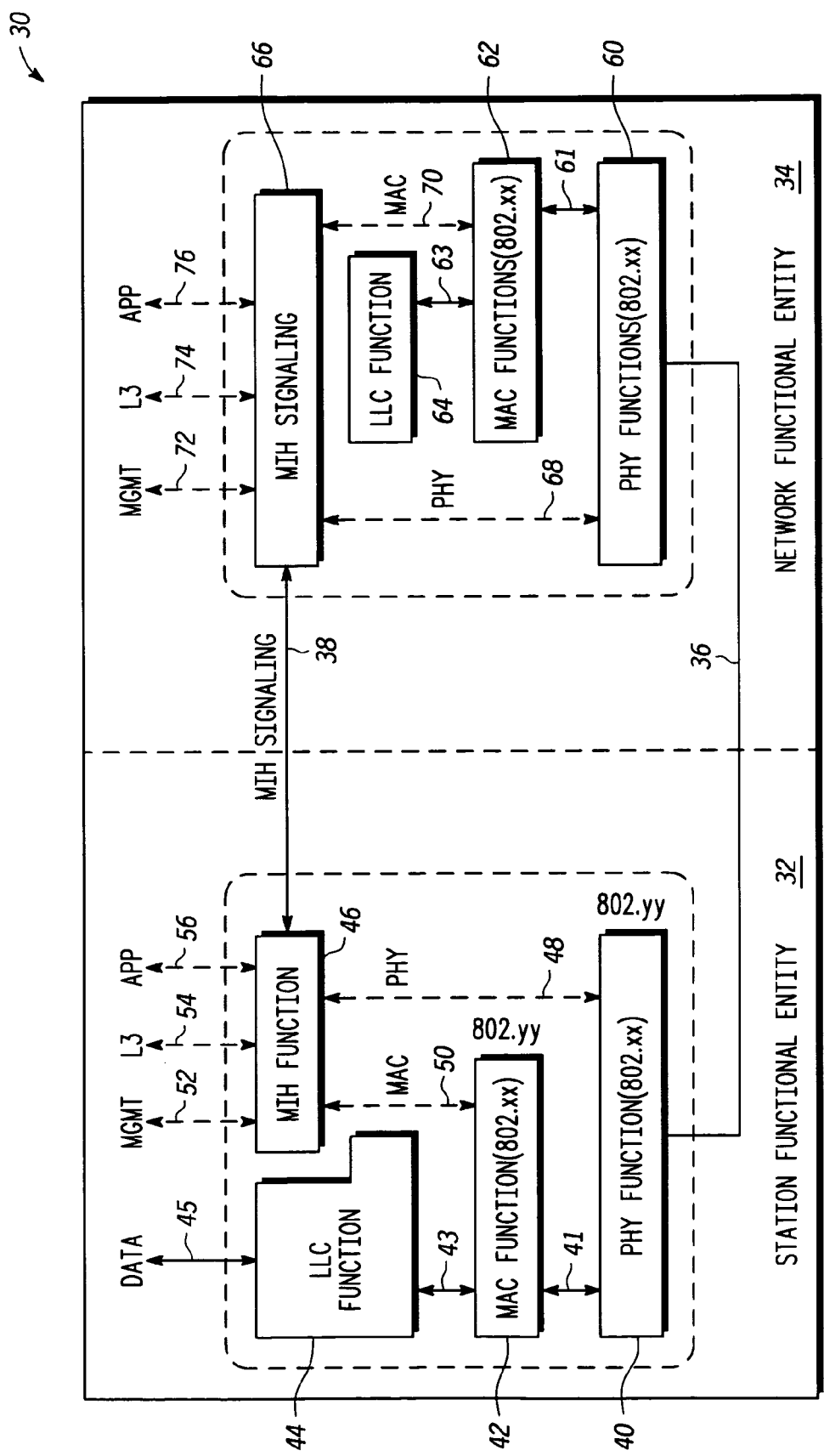
FIG. 2 is a schematic block diagram view of any suitable transport protocol for use to exchange MIH function events between a station functional entity and a network functional entity according to an embodiment of the present disclosure.

FIG. 2 is a schematic block diagram view 30 of any suitable network protocol for use to exchange MIH function events between a station functional entity 32 and a network functional entity 34 according to an embodiment of the present disclosure. Coupling between the station functional entity 32 and network functional entity 34 includes physical layer signaling as indicated by reference numeral 36 and MIH signaling as indicated by reference numeral 38. The station functional entity 32 includes at least a physical layer function (PHYFunction(802.xx)) block 40 and data link layer function blocks 42 and 44. In particular, data link layer function blocks comprise a medium access control (MAC) function (MAC-Function(802.xx)) block 42 and a logical link control (LLC) function (LLCFunction) block 44. Communications between respective ones of the PHY, MAC and LLC function blocks are indicated by reference numerals 41 and 43. In addition, LLC function block 44 communicates to and receives data from a next level in the seven-level OSI model, as indicated by reference numeral 45, corresponding to data.

Station functional entity 32 further includes a media independent handover function (MIHFunction) block 46. Communications between respective ones of the PHY, MAC and MIH function blocks are indicated by reference numerals 48 and 50. In addition, MIH function block 46 communicates to and receives data from other layers in the seven-level OSI model, as indicated by reference numerals 52, 54 and 56, corresponding to management, layer 3, and application level information, respectively.

The network functional entity 34 includes at least a physical layer function (PHYFunction(802.xx)) block 60 and data link layer function blocks 62 and 64. In particular, data link layer function blocks comprise a medium access control (MAC) function (MACFunction(802.xx)) block 62 and a logical link control (LLC) function (LLCFunction) block 64. Communications between respective ones of the PHY, MAC and LLC function blocks are indicated by reference numerals 61 and 63. In addition, LLC function block 64 communicates to and receives data from a next level in the seven-level OSI model (not shown) corresponding to data.

Network functional entity 34 further includes a media independent handover function (MIHFunction) block 66. Communications between respective ones of the PHY, MAC and MIH function blocks are indicated by reference numerals 68 and 70. In addition, MIH function block 66 communicates to and receives data from other layers in the seven-level OSI model, as indicated by reference numerals 72, 74 and 76, corresponding to management, layer 3, and application level information, respectively.

FIG. 3 is a classification table view 80 of possible handover (HO) scenarios for (i) MIH capable and (ii) non-MIH capable mobile units and (i) MIH capable and (ii) non-MIH capable network controllers according to an embodiment of the present disclosure. As shown in FIG. 3, "MN" represents any suitable mobile node and "Network Controller" represents any suitable network controller, for example, an access point (AP), base station controller (BSC), base transceiver station (BTS), etc. In a first classification indicated by reference numeral 82, both the mobile node and the network controller are MIH capable. Accordingly, Class-1 is indicative of full handover (HO) capability for both the mobile node and the network controller, i.e., a likely scenario for following MIH handover (HO) procedures, as recommended, when possible or needed. In a second classification indicated by reference numeral 84, the mobile node is MIH capable and the network controller is non-MIH capable. Accordingly, Class-2 is indicative of handover (HO) capability for the mobile node only, i.e., a more likely scenario for initiating a device-initiated MIH handover (HO), where applicable. In a third classification indicated by reference numeral 86, the network controller is MIH capable but the mobile node is non-MIH capable. Accordingly, Class-3 is indicative of handover (HO) capability for the network controller only, i.e., a more likely scenario for initiating a network-initiated MIH handover (HO), where applicable. In a fourth classification indicated by reference numeral 88, both the mobile node and the network controller are non-MIH capable. Accordingly, Class-4 is indicative of legacy and existing systems not having MIH handover (HO) capability.

According to one embodiment, the method comprises mobility and handover (HO) attributes according to the following important mobility enablers or components. One component includes a network capability ID in the form of a modified beacon, referred to herein as an MIH-Beacon. Another component is the use of a best fit in a native protocol. The best fit in the native protocol comprises implementing a Control Channel concept in a broadcast mode that fits into existing protocols and may vary one to another protocol, in placement. Yet another component comprises the utilization of an optimized channel and spectral efficiency for a minimal protocol impact. For a mobile node device initiated MIH handover (HO), the method uses link metrics (L3) and levels 1 and 2 (L1-L2) reporting. In addition, the method is independent of legacy systems, wherein an MIH handover can be successfully carried out. In other words, the method of MIH handover works with legacy systems, regardless. Furthermore, the method takes into account other protocol elements, such as billing, tariffs, Quality of Service (QoS), etc., per existing protocols, with no change to the respective protocols. Moreover, the method utilizes existing security measures, such as link security and higher level protections. Link security can include AAA, certificates, trust mechanisms, etc. and higher layer protection can include DRM (content protection). The method may also utilize power saving (PS) modes, for example, battery-efficient net scanning, low-power modes, etc.

Figure 4:
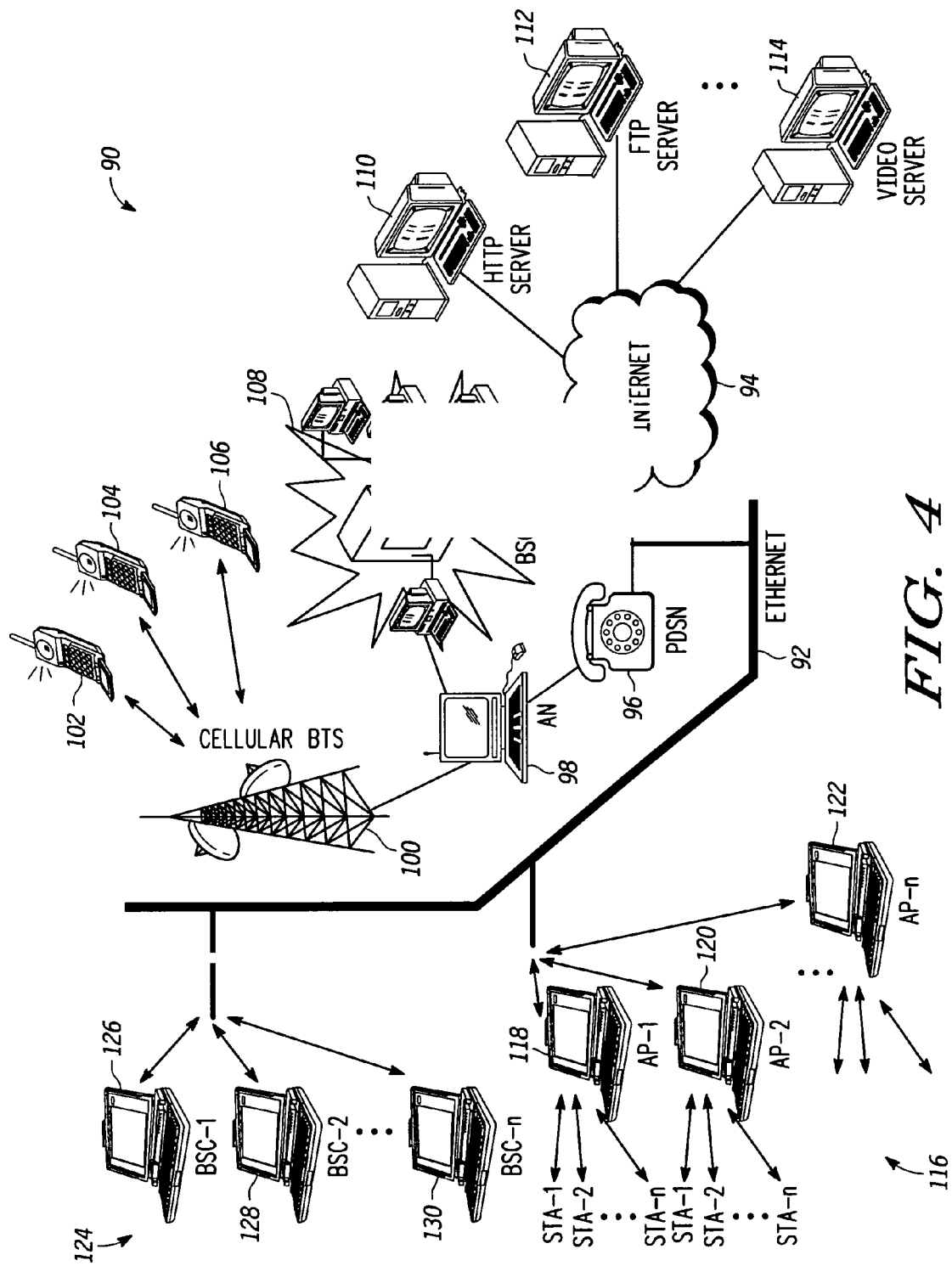
FIG. 4 is a schematic block diagram view of another heterogeneous network illustrating a variety of connections using existing protocols as native-modes.

FIG. 4 is a schematic block diagram view of another heterogeneous network 90 illustrating a variety of connections using existing protocols as native-modes. As shown, network 90 includes an Ethernet 92, the Internet 94, Public Domain Switched Network (PDSN) 96, Access Node (AN) 98, and Cellular Base Transceiver Station (BTS) 100. Cellular BTS 100 communicates with mobile nodes (MN) 102, 104 and 106. AN 98 is coupled between PDSN 96, Cellular BTS 100, and Base Station Controller (BSC) 108. Internet 94 is coupled between Ethernet 92, PDSN 96, Hyper Text Transport Protocol (HTTP) server 110, File Transport Protocol (FTP) server 112, and Video server 114. Internet 94 couples to additional servers as represented by the series of dots "..." as illustrated in the FIG. 4. In addition, a series 116 of access points (AP-1, AP-2, ..., AP-n), indicated by reference numerals 118, 120, and 122, couple to Ethernet 92. Each of the access points (AP-1, AP-2, ..., AP-n) couple to a series of stations STA-1, STA-2, ..., STA-n, respectively. In addition, a series 124 of base station controllers (BSC-1, BSC-2, ..., BSC-n), indicated by reference numerals 126, 128, and 130, also couple to Ethernet 92. According to an embodiment of the present disclosure, the method is based on using existing protocols as native-modes, introducing only two new elements (i.e., an MIH beacon that includes an MIH-capability (MIHC) flag, and an MIH beacon message), and leveraging Mobile Internet Protocol v6 (MoIPv6). In addition, changes to other elements in the heterogeneous network are unnecessary, since the method according to the embodiments of the present disclosure relies on existing net/link security mechanisms, and in that service engines are implementation specific. Furthermore, FIG. 4 illustrates only one example of a heterogeneous network. Other configurations are possible, for example, with respect to network types, station types, etc.

Figure 5:
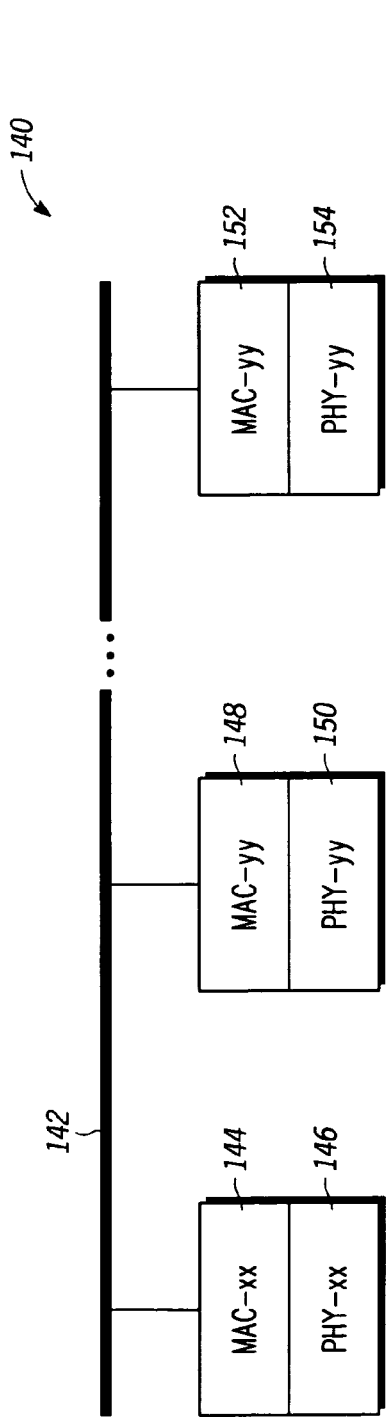
FIG. 5 is a block diagram representation view of a logical handover (HO)

FIG. 5 is a block diagram representation view 140 of a logical handover (HO). In the logical HO view 140, all traffic types and payload converge on the Ethernet level 142 and follow MoIPv6 rules, such as home address (Home-Adr), care-of address (c/o-Adr), subnet fields, etc. For example, layer pairs (MAC-xx 144 and PHY-xx 146), (MAC-yy 148 and PHY-yy 150), (MAC-zz 152 and PHY-zz 154) of associated network devices (not shown) converge on Ethernet 142. In addition, a service engine plays a big role on Fast-HO, wherein the service engine enables native and non-native traffic flows; and an associated net-controller can harmonize, when needed.

According to embodiments of the present disclosure, a method of providing an MIH-beacon comprises one or more of (i) a network and mobile node (MN) configured to broadcast the MIH-beacon, (ii) a mobile node (MN) configured to scan for networks in the background, and (iii) a mobile node configured to advertise neighboring networks. With respect to the embodiment of a network and mobile node (MN) configured to broadcast the MIH-beacon, the broadcast comprises a periodic broadcast. The beacon contains MIH capabilities of the network and of the mobile node. Alternatively, in another embodiment, the network is configured to broadcast MIH capability-flag only. In the latter embodiment, the MN is configured to recognize that the network is MIH capable. In response to recognition that the network is MIH capable, the MN then queries the network for detailed MIH capabilities. Still further, this embodiment could also be performed in reverse for the MN, wherein the MN is configured to broadcast an MIH capability-flag only, and so on.

With respect to another embodiment, a mobile node (MN) is configured to scan for networks in the background. In this embodiment, the MN decides when it wants to roam onto a new network. While the MN exchanges basic capabilities with the new network during registration, the MIH capabilities of both the MN and the new network are exchanged during the registration process.

With respect to another embodiment, a mobile node (MN) is configured to advertise neighboring networks. In this embodiment, the MN performs a periodic broadcast of the networks that the MN has heard.

In one embodiment, the method of using an MIH beacon comprises configuring a network to broadcast the MIH beacon. In particular, the network is configured to provide a periodic broadcast of the MIH beacon. The MIH beacon contains MIH capabilities of the broadcasting network. In this embodiment, various modifications are needed to the existing protocol. A new management message, or other appropriate frame, is used to indicate the MIH beacon and for communicating the MIH capabilities of the network. In addition, a new data type is provided to define the MIF capabilities.

According to one embodiment of the present disclosure, an MIH network selection scenario can include the following. 1.) Upon a power-up (or an association) event, the MN scans for the presence of an MIH beacon. The scan can include, for example, scanning in a MN native mode initially and then proceeding to other modes, as may be appropriate for a given power-up or association event. Responsive to a detection of the presence of the MIH beacon, the MN immediately registers in the native mode, if available. 2.) If the MN receives the MIH beacon from multiple networks, the MN determines and tracks the network types, which could use influence from a service engine, etc. 3.) The MN is further configured to determine a primary function, which may include (i) adherence to service engine rules to determine a network selection, and (ii) link metrics that influence a decision to associate, or to not associate. 4.) Responsive to determination of a network selection and a decision based upon link metrics to associate with a given network, the MN then registers with the corresponding network.

Figure 6:
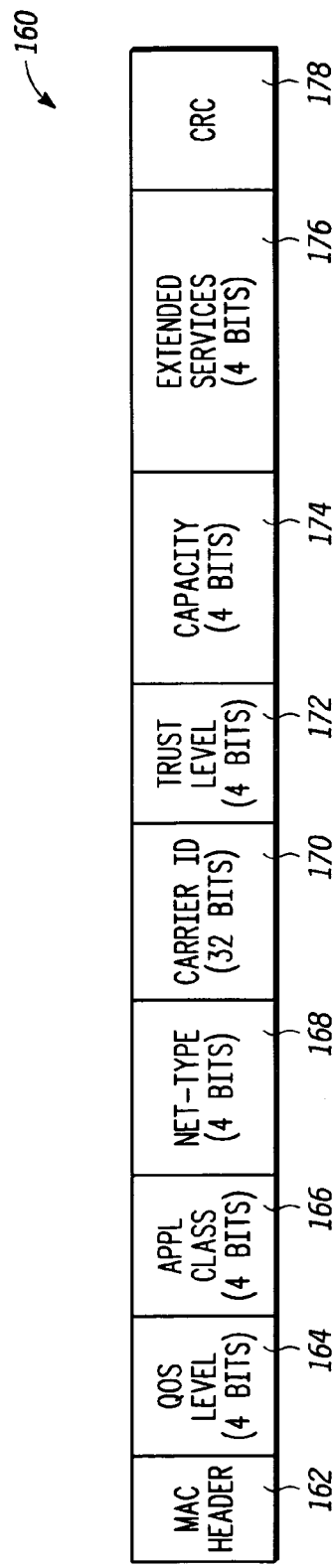
FIG. 6 is a block representation view of a MIH beacon message content used in a method according to one embodiment of the present disclosure.

FIG. 6 is a block representation view of MIH beacon message content 160 used in a method according to one embodiment of the present disclosure. The MIH beacon message content 160 includes a number of fields that comprise one or more of a MAC header 162, a quality of service (QoS) level 164 (4 bits), an application class 166 (4 bits), a network type (NET-TYPE) 168 (4 bits), a carrier identification 170 (Carrier ID) (32 bits), a trust level 172 (4 bits), a capacity 174 (4 bits), extended services 176 (4 bits), and a cyclic redundancy check (CRC) 178.

The MIH beacon further includes an MIH-Capability (MIHC) flag, wherein the flag can comprise one of two states at any given time. The MIHC flag comprises a single bit, for example, that represents either a TRUE state or a FALSE state. Accordingly, such an MIHC flag provides for a most spectrally efficient option. In one embodiment, the MIHC flag is an alternative to broadcasting an MIH beacon; it incurs less overhead (one bit versus many bits) and works better with existing protocols that have limited room for expansion. The MIHC flag could be inserted in virtually any packet (or packet header) that's transmitted on a regular basis, wherein the MIHC flag is located in a predetermined location known to both the network and the MN. Upon receiving an MIHC flag, a MN follows the procedures described in the following paragraph to determine the network's exact MIH capabilities.

In one embodiment, if the MIHC flag is set or TRUE, then several options may be implemented. Those options include, for example, one or more of the following: (i) MN could query the network for additional details or share its capability information with the network; (ii) capability information services (IS) may also be shared via a suitable form of flexible extensible markup language (XML) and permissions, as one example of implementation; (iii) a service engine may perform a look-up to get appropriate MIH details, for example, each field maps to a look-up table for decode.

In addition, if the MIHC flag is not set or FALSE, then the MN could still register with the network by sending the MN's visiting network information (net info) to the MN's native network (net) along with routing information. A service engine could determine an association or other options, as appropriate, for a given handover.

With respect MIH field content, it may contain an MIH capability information field or service (IS). The MIH capability information field or service (IS) can be mandatory or optional IS. Including mandatory and optional fields enables the provision for flexible growth. Mandatory classifications can include, for example, one or more of Net-type, QoS class, tariff/free, carrier-ID, trust-level, capacity, extended services, and link metrics. Optional fields may include, for example, one or more of expansion Net-types, data rates, capacity, extended services support, home Net-member, security grade, nomadic support, etc. Furthermore, one embodiment includes adopting of a common set of field content for MIH.

Figure 7:
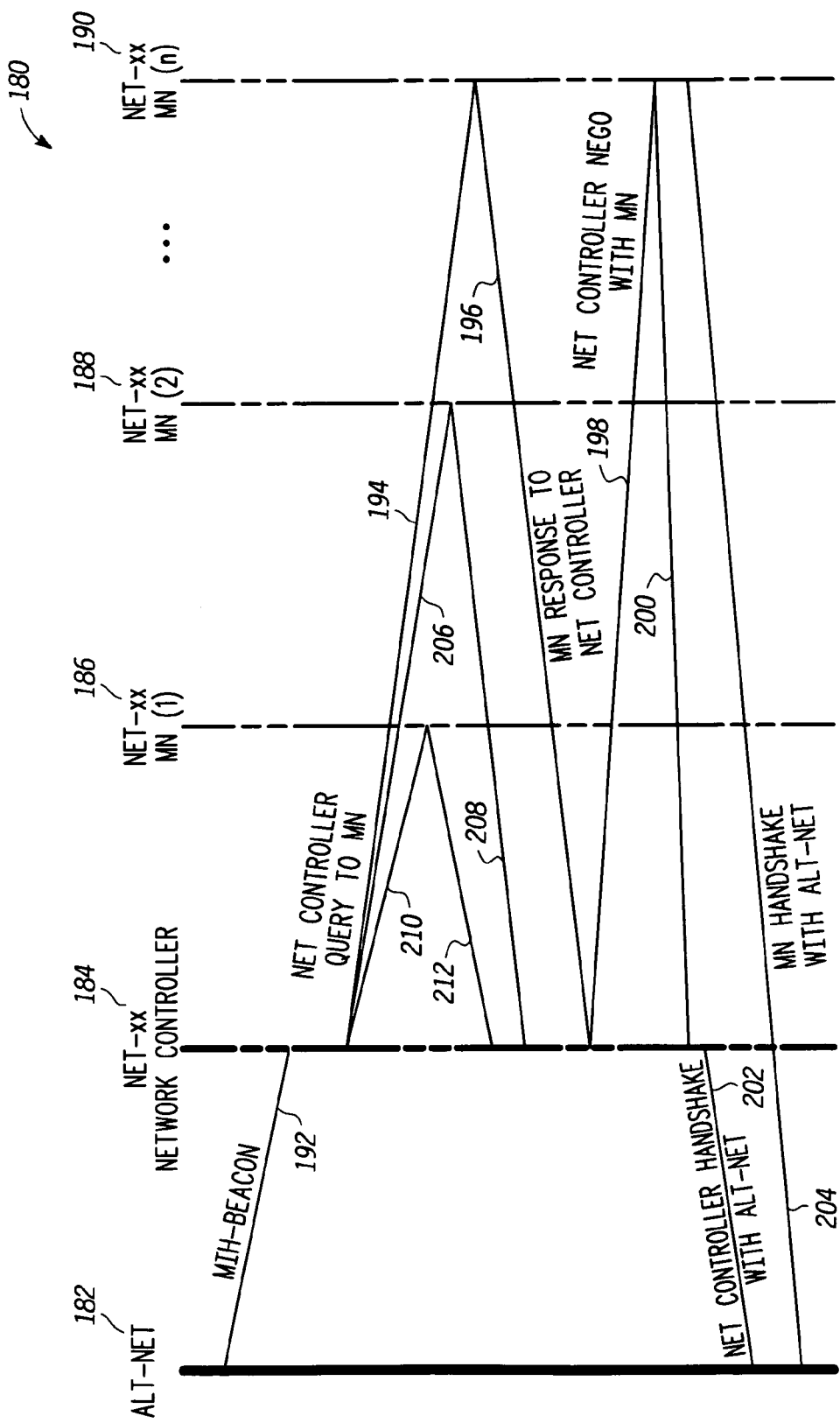
FIG. 7 is a graphical representation view of a probe/response flow of a handover (HO) carried out in a method according to one embodiment of the present disclosure.

FIG. 7 is a graphical representation view 180 of a probe/response flow in a handover (HO) carried out in the method according to one embodiment of the present disclosure. As illustrated, the handover can involve one or more of an Alt-Net 182, Net-xx Network Controller 184, Net-xx MN(1) 186, Net-xx MN (2) 188, ..., Net-xx MN (n) 190. In this illustration, the Alt-Net 182 broadcasts an MIH-beacon 192. Responsive to the MIH-beacon 192, the Net-xx Network Controller 184 outputs a Net Controller query to the MNs, as illustrated by reference numerals 194, 206, and 210. Responsive to the Net Controller query 194, 206, and 210, the respective MNs 190, 188, and 186 provide an appropriate MN response to the Net Controller 184. In this example, in response to the MN response 196, Network Controller 184 negotiates with MN 190 for the handover as indicated by reference numeral 198. MN 190 responds to the Network Controller 184 at 200. Network Controller 184 then performs a handshake with the Alt-Net 182 as indicated by reference numeral 202. The MN then handshakes with the Alt-Net 182 as indicated by reference numeral 204.

Further in connection with the illustration of FIG. 7, the embodiments of the present disclosure can include conceptual steps in a handover (HO) as follows: (1) Network advertising of MIH capability with the use of common criteria, (2) L2 querying its associated L1 for link metrics, (3) L1 reporting of relevant parameters, (4) L2 (or other higher entity) determining suitability for HO, including two options, and (5) negotiating HO and eventual transfer.

In one step, network advertising of MIH capability with the use of common criteria can include, for example, (a) network advertising based on MIH beacons with link information systems (IS), and (b) network advertising that satisfies service engine requirements or enhances it. In another step, L2 querying its associated L1 for link metrics can include, for example, (a) L2 knowing relevant/preferred services, (b) L2 differentiating in-service HO, from keeping-tabs, etc., and (c) that the L2 queries may all be initiated by the service engine. In another step, L1 reporting of relevant parameters can include, for example, (a) L1 reporting link quality and connection type, (b) L2 reporting metrics per an agreed upon list, (c) L2 reporting continuously, periodically, or on an as-needed basis, as may be appropriate of a particular HO scenario. In yet another step, L2(or other higher entity) determining suitability for HO, including two options, can include, for example, (a) device requesting HO, which is user initiated, and (b) network requesting HO, which is carrier initiated. In another step, negotiating HO and eventual transfer can include, for example, (a) maintenance of service and associated performance, and (b) maintenance of an appropriate service grade, billing agreements, etc. Furthermore, many options can be developed for this HO. FIG. 7 illustrates an example probe/response flow involving an alternate network to MIH Net Controller to MN, etc.

In addition, according to yet another embodiment, the method of implementing a Media Independent Handover (MIH) service can include treatment of the MIHC flag as an indication of compliance to agreed-upon rules. The agreed-upon rules may specify that MIH capability information will not be transmitted over a wireless connection (i.e., for security reasons) but instead initiates a wired (Ethernet) connection to a registration database or service engine that authenticates the MN and returns the MIH capability information.

Examples of link metrics can include indicators for link quality. Indicators for link quality can include one or more of the following: Combination of PHY/MAC parameters; RSSI, SNR, PER/BER, RTS/CTS, highest PHY data rate supported, power management modes, RTS threshold, service priority, frame size & spacing, fragmentation status, Retry of un-ACK frames, Management and Control frames, metric about capacity or population (number of MNs), PHY type, nominal beacon intervals, etc.; and some link indicators may be normalized with application or service. Not every element may be available or appropriate for reporting across all network types. In other words, there may be some basic set of link quality indicators that will be mandatory, others may be service engine specific and optional. Furthermore, whatever link metrics get reported will only be a factor for MIH, as service engines will generally make any final determination.

The embodiments of the present disclosure provide for a spectrally-efficient MIH beacon that allows for MIH-signaling using a minimal amount of information, followed by (a) a deferred address for the rest of the link and (b) network (etc.) details later in another field. This method is intended to minimize (a) the overhead in the channel and/or (b) the link traffic and only allow those MN interested/capable of HO to reference the finer details. Effects of these types of savings (i.e., minimizing channel overhead or link traffic) will vary depending on the frequency of this type of beaconing, its length, and will also depend on channel conditions—e.g., noise, signal strength and the overall population and how frequently members disassociate or re-associate with the network controller. This method also minimizes an impact on various protocols involved in the MIH signaling.

The embodiments of the present disclosure aim to facilitate MIH services for mobile nodes and networks capable of supporting multiple protocols while adhering to the requirements of the IEEE 802.21 Working Group (WG). The embodiments of the present disclosure can be evaluated with use of the following: Each MN can comprise a multi-mode MN capable of MIH. Functions supported through layer 2 (L2) include: net-detection, net-selection, and seamless HO. Application classes are based on suitable classification systems.

In the foregoing specification, the disclosure has been described with reference to the various embodiments. However, one of ordinary skill in the art appreciates that various modifications and changes can be made without departing from the scope of the present embodiments as set forth in the claims below. Accordingly, the specification and figures are to be regarded in an illustrative rather than a restrictive sense, and all such modifications are intended to be included within the scope of the present embodiments. Accordingly, the embodiments of the present disclosure help establish a fast, reliable and optimized method for enabling MIH services by potentially leading to a standardized format between disparate wireless and wired network protocols. Furthermore, while the embodiments of the present disclosure have been discussed with reference to IEEE 802.21, it is noted that the embodiments may also be applicable to standards other than IEEE 802.21, for example, including Unlicensed Mobile Access (UMA), Fixed-Mobile Convergence Alliance (FMCA), Digital Living Network Alliance (DLNA), and other like standards.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the term "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method for implementing a Media Independent Handover (MIH) service between one or more of a heterogeneous and a non-heterogeneous network comprising:
   providing an MIH beacon from one or more of a network (Net) or a mobile node (MN);
   acknowledging a receipt of the MIH beacon by another of the network (Net) or the mobile node; and
   facilitating handover (HO) services in response to an acknowledged receipt, and further in response to an MIH beacon message subsequently provided from one or more of the network (Net) or the mobile node, wherein the network (Net) is not MIH capable and the mobile node (MN) is MIH capable, and wherein handover procedures are mobile node-initiated, as needed.

2. The method of claim 1, wherein the MIH beacon comprises at least an MIH-Capability (MIHC) flag, the MIHC flag having one of a first state or a second state.

3. A method for implementing a Media Independent Handover (MIH) service between one or more of a heterogeneous and a non-heterogeneous network comprising:
   providing an MIH beacon from one or more of a network (Net) or a mobile node (MN);
   acknowledging a receipt of the MIH beacon by another of the network (Net) or the mobile node; and
   facilitating handover (HO) services in response to an acknowledged receipt, and further in response to an MIH beacon message subsequently provided from one or more of the network (Net) or the mobile node, wherein the MIH beacon comprises at least an MIH-Capability (MIHC) flag, the MIHC flag having one of a first state or a second state.

4. The method of claim 3, wherein the network comprises a network controller (Net-controller).

5. The method of claim 3, wherein the handover (HO) is a network-initiated handover.

6. The method of claim 3, wherein the handover (HO) is a mobile node-initiated handover.

7. The method of claim 3, wherein both the network (Net) and the mobile node (MN) are MIH capable, and wherein handover procedures are either network-initiated or mobile node-initiated, as needed.

8. The method of claim 3, wherein the network (Net) is MIH capable and the mobile node (MN) is not MIH capable, and wherein handover procedures are network-initiated, as needed.

9. The method of claim 3, wherein the MIH beacon and the MIH beacon message reduce an associated network overhead required for HO services.

10. The method of claim 3, wherein the one of the first or second states represents TRUE and the other one of the first or second states represents FALSE.

11. The method of claim 3, wherein the MIHC flag comprises a single bit.

12. The method of claim 3, wherein the MIHC flag being in the first state represents the MIHC flag being set.

13. The method of claim 3, wherein responsive to the MIHC flag being in the first state, the method further comprising:
   implementing one or more first state HO options.

14. The method of claim 13, wherein the one or more first state HO options include the MN querying the network for additional details or the MN sharing its capability information with the network.

15. The method of claim 14, wherein sharing the capability information comprises sharing a form of flexible XML and permissions.

16. The method of claim 13, wherein the one or more first state HO options include a service engine performing a look-up to retrieve MIH details, further wherein prescribed fields map to a corresponding look-up table for being decoded.

17. The method of claim 3, wherein the MIHC flag being in the second state represents the MIHC flag being not set.

18. The method of claim 17, wherein responsive to the MIHC flag being in the second state, the method further comprising:
   implementing one or more second state HO options.

19. The method of claim 18, wherein the one or more second state HO options include (i) the MN registering with the network, (ii) the MN sending to its native network (a) visiting network information and (b) routing information, and (iii) a service engine determining (a) an association between the MN and the visiting network or (b) other alternate options.

20. A method of enabling Media Independent Handover (MIH) services between disparate wireless and wired network protocols comprising:
   providing an MIH beacon from one or more of a network (Net) or a mobile node (MN);
   acknowledging a receipt of the MIH beacon by another of the network (Net) or the mobile node; and
   facilitating handover (HO) services in response to an acknowledged receipt, and further in response to an MIH beacon message subsequently provided from one or more of the network (Net),
   wherein the MIH beacon comprises at least an MIH-Capability (MIHC) flag, the MIHC flag having one of a first state or a second state,
   wherein responsive to the MIHC flag being in the first state, the method further comprising:
      implementing one or more first state HO options, wherein the one or more
      first state HO options include (a) the MN querying the network for additional details or the MN sharing its capability information with the network or (b) the mobile node or a service engine performing a look-up to retrieve MIH details,
      further wherein prescribed fields map to a corresponding look-up table for being decoded, and
   wherein responsive to the MIHC flag being in the second state, the method further comprising:
      implementing one or more second state HO options, wherein the one or more second state HO options include (i) the MN registering with the network, (ii) the MN sending to its native network (a) visiting network information and (b) routing information, and (iii) a service engine determining (a) an association between the MN and the visiting network or (b) other alternate options.

* * * * *